(12) United States Patent
Wolk et al.

(10) Patent No.: US 8,997,456 B2
(45) Date of Patent: Apr. 7, 2015

(54) COMPRESSION IGNITION ENGINE WITH LOW LOAD RAPID WARM UP STRATEGY

(75) Inventors: Matthew Wolk, Peoria, IL (US); Gurudutt Nayak, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 483 days.

(21) Appl. No.: 13/494,438

(22) Filed: Jun. 12, 2012

(65) Prior Publication Data

US 2013/0332051 A1 Dec. 12, 2013

(51) Int. Cl.
*F01N 3/18* (2006.01)
*F02B 37/24* (2006.01)
*F02D 41/00* (2006.01)
*F02D 41/02* (2006.01)
*F02D 41/40* (2006.01)
*F02M 25/07* (2006.01)

(52) U.S. Cl.
CPC ............ *F02B 37/24* (2013.01); *F02D 41/0007* (2013.01); *F02D 41/0055* (2013.01); *F02D 41/0255* (2013.01); *F02D 41/405* (2013.01); *F02M 25/0749* (2013.01); *Y02T 10/144* (2013.01); *Y02T 10/26* (2013.01); *Y02T 10/44* (2013.01); *Y02T 10/47* (2013.01)

(58) Field of Classification Search
CPC .................................................. F02D 41/0255
USPC .................... 60/278, 280, 284, 286, 602, 603
See application file for complete search history.

(56) References Cited

U.S. PATENT DOCUMENTS

| | | | |
|---|---|---|---|
| 5,778,674 A | 7/1998 | Kimura | |
| 6,314,735 B1 | 11/2001 | Kolmanovsky et al. | |
| 7,836,685 B2 | 11/2010 | Yokoi et al. | |
| 7,877,981 B2 | 2/2011 | Newman | |
| 7,975,469 B2 | 7/2011 | Gonze et al. | |
| 8,024,919 B2 | 9/2011 | Fluga et al. | |
| 8,037,675 B2 | 10/2011 | Tahara et al. | |
| 2004/0159098 A1 | 8/2004 | Gui et al. | |

FOREIGN PATENT DOCUMENTS

WO 02/055856 7/2002
WO 2007/097944 8/2007

*Primary Examiner* — Kenneth Bomberg
*Assistant Examiner* — Jonathan Matthias
(74) *Attorney, Agent, or Firm* — BakerHostetler

(57) ABSTRACT

An electronically controlled compression ignition engine includes an electronic engine controller in control communication with fuel injectors, a high pressure exhaust recirculation system and a variable geometry turbocharger. The controller is configured to execute a low load rapid warm up algorithm that generates control signals to reduce turbine efficiency, set an air fuel ratio in a predetermined range, set the exhaust gas recirculation in a predetermine range and supply fuel in a split injection in each engine cycle that includes a main injection initiated before top dead center and a post injection initiated after top dead center. These settings allow for rapid warm up to the aftertreatment inlet in excess of 300° C.

20 Claims, 2 Drawing Sheets

COMPRESSION IGNITION ENGINE WITH LOW LOAD RAPID WARM UP STRATEGY

TECHNICAL FIELD

The present disclosure relates generally to exhaust thermal management in a compression ignition engine equipped with a variable geometry turbine and a high pressure exhaust recirculation system, and more particularly to a low load rapid warm up strategy for quickly achieving exhaust aftertreatment operational temperatures.

BACKGROUND

Although the art, such as international patent publication WO 2007/097944 B2, recognize that thermal management of compression ignition engines during low load conditions can be problematic, there may be so many different and cross coupled control choices available that finding a combination of control choices that produce an acceptable aftertreatment inlet temperature, an acceptable NOx to soot ratio, an acceptable NOx flow rate, an acceptable particulate matter flow rate and finally an acceptable exhaust volumetric flow within known constraints can be extremely elusive.

Exhaust aftertreatment systems for compression ignition engines may include at least one of a diesel particulate filter and a NOx reduction system. Proper operation of these aftertreatment systems typically require that aftertreatment inlet conditions exceed some temperature threshold, such as 300° C. This minimum temperature is often required for particle trap regeneration, urea deposit removal and effective operation to reduce tailpipe out emissions.

The present disclosure is directed toward one or more of the problems set forth above.

SUMMARY

In one aspect, a method is taught for rapidly warming up an aftertreatment inlet temperature at low load conditions for a compression ignition engine equipped with a variable geometry turbocharger, electronically controlled fuel injectors and a high pressure exhaust gas recirculation loop. The method includes the steps of setting a turbine efficiency below 26%, setting an air fuel ratio in a range between 20:1 and 30:1, and setting an exhaust gas recirculation in a range between 28% and 36%. In addition, fuel is injected in a split injection with a main injection initiated before top dead center and a post injection initiated after top dead center in a same engine cycle.

In another aspect, an electronically controlled compression ignition engine includes an engine housing that defines a plurality of cylinders. Electronically controlled fuel injectors are positioned for direct injection into respective ones of the plurality of cylinders. An electronically controlled high pressure exhaust recirculation system is attached to the engine housing. An electronically controlled variable geometry turbocharger is fluidly connected to the engine housing. An electronic engine controller is in control communication with the fuel injectors, the high pressure exhaust recirculation system and the variable geometry turbocharger. The electronic engine controller is configured to execute a low load rapid warm up algorithm that generates control signals for a turbine efficiency below 26%, an air fuel ratio in a range between 20:1 and 30:1, an exhaust gas recirculation in a range between 28% and 36%, and split fuel injection in an engine cycle that includes a main injection initiated before top dead center and a post injection initiated after top dead center.

DETAILED DESCRIPTION

Figure 1:
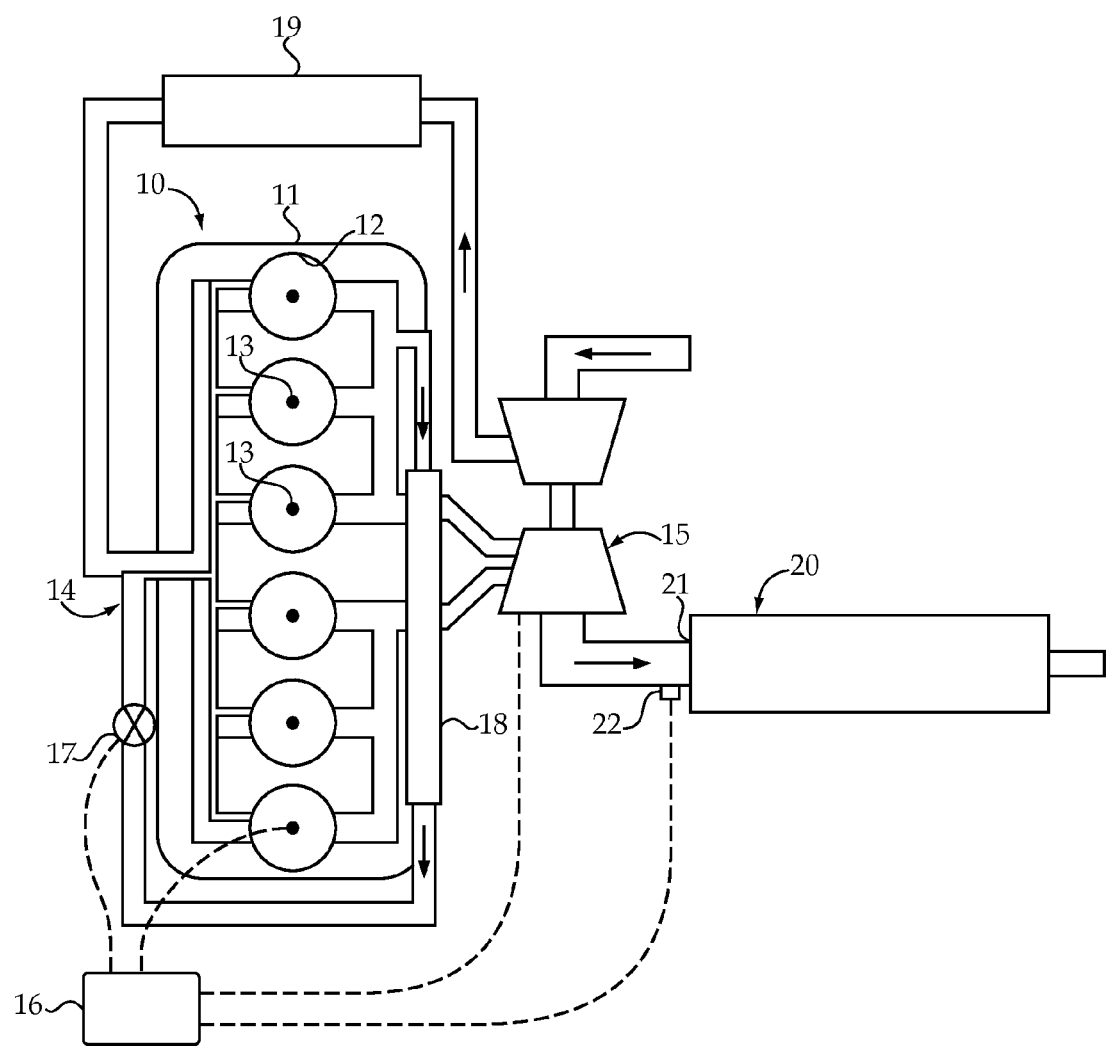
FIG. 1 is a schematic view of an electronically controlled compression ignition engine according to the present disclosure.

Referring to FIG. 1, an electronically controlled compression ignition engine 10 includes an engine housing 11 that defines a plurality of cylinders 12. Electronically controlled fuel injectors 13 are positioned for direct injection into respective ones of the plurality of cylinders 12. An electronically controlled high pressure exhaust recirculation system 14 is attached to engine housing 11. An electronically controlled variable geometry turbocharger 15 is fluidly connected to the engine housing 11. An outlet from the turbocharger 15 is fluidly connected to an inlet 21 of an aftertreatment system 20. Among others, aftertreatment system 20 may include a diesel oxidation catalyst, a diesel particulate filter and a NOx reduction system that may or may not utilize injected urea and a catalyst. An electronic engine controller 16 is in control communication with the fuel injectors 13, an EGR valve 17 of the high pressure exhaust recirculation system 14 and with the variable geometry turbocharger 15. Electronic engine controller 16 may also receive aftertreatment inlet temperature data from temperature sensor 22. Although not necessary, engine 10 may also include an aftercooler 19, an EGR cooler 18 and many other components well known in the art.

The present disclosure is primarily directed to low load operation of an engine equipped as set forth above. For purposes of this disclosure, low load means a brake mean effective pressure (BMEP) below 550 kPa. Those skilled in the art will appreciate that BMEP may be calculated using the following equation.

$$\text{BMEP} = ((\text{horsepower} * 13{,}000)/(\text{displacement (liters)} * \text{engine RPM})) * 6.89$$

Although all engines according to the present disclosure will include a variable geometry turbocharger and a high pressure EGR loop, an engine may also include a low pressure EGR loop and/or a second turbocharger without departing from the present disclosure. Many of today's engines are equipped with the ability to utilize exhaust gas recirculation to vary combustion conditions, but the conventional wisdom is that low load operation should have EGR off in order to provide for snap torque capability. However, the present disclosure recognizes that, with the variable geometry turbine (VGT) having nearly closed vanes, and using EGR, the turbine speed can be rather high. This then allows for standard transient engine capability with minimal impact on productivity, while keeping high turbine outlet temperatures even at low loads. Nevertheless, finding a recipe with a suitable turbine outlet temperature, such as greater than 500° C., an acceptable NOx/soot ratio such as 40:1, an acceptable exhaust volumetric flow rate and both NOx flow and particulate matter flow rates that match the capabilities of the aftertreatment system 20 can be extremely difficult, due at least in part to the fact that all of the control features are cross coupled so that a change in anything virtually results in a change in everything.

After some experimentation and substantial simulation work, it was concluded that a low load rapid warm up strategy would require the use of a split injection strategy with a main injection shot being initiated before top dead center and a late injection quantity initiated after top dead center to add heat to the exhaust. The main shot may reduce turbine flow and the late injection still occurs during autoignition conditions so that the post injection fuel ignites in cylinder. The late combustion delivers less work to the engine crankshaft, with more of the heat release being added to the exhaust. This split injection strategy coupled with a precise EGR control and VGT efficiency adjustment can lead to a suitable air fuel ratio, with relatively low soot and high turbine outlet temperatures while maintaining low turbine outlet flow. In particular, the present disclosure teaches setting a turbine efficiency less than 26% and an EGR percent between 28% and 36%. The present disclosure also teaches that the various control settings should arrive at an air fuel ratio in a range between 20:1 and 30:1.

Although the specific split injection parameters may vary somewhat from engine to engine, for the specific six cylinder engine illustrated, which corresponds to a Caterpillar C9 engine, the main injection shot(s) should be initiated between 10° and 20° before top dead center. The C9 engine has six cylinders and a total displacement of 9.3 Liters. In this example engine, the initial injection pressure, assuming a common rail fueling system should be between 80 MPa and 130 MPa. The post injection shot(s) in the specific engine, were initiated between 15° and 32° after top dead center in the same engine cycle with a dwell between the main and post injections of at least 3500 micro seconds. Finally, the post injection quantity, again in the specific illustrated engine, required at least 35 cubic millimeters of fuel to be injected in the post injection shot(s). Other engines might scale the post injection quantity based upon that engine's displacement relative to the C9 displacement relative to the C9 displacement identified above. Thus, those skilled in the art will appreciate that the term split injection, for purposes of the present disclosure, means one or more injection shots constituting a main injection sequence separated by a dwell before one or more post injection shots. Thus, both the main and post injections might themselves be a sequence of injection shots without departing from the present disclosure, but a main injection constituting a single shot and a post injection likewise constituting a single shot would still fall within the scope of the present disclosure. Those skilled in the art will appreciate that the injection pressures, specific timings and dwell times could very substantially from one engine to another, and could vary for a single engine depending upon such factors as the number and size of injector orifices and many other factors known in the art. Thus, some experimentation might be necessary with each individual set of engine hardware in order to identify preferred injection timings, injection pressures and other fuel injection parameters for each individual engine and its associated hardware components.

Figure 2:
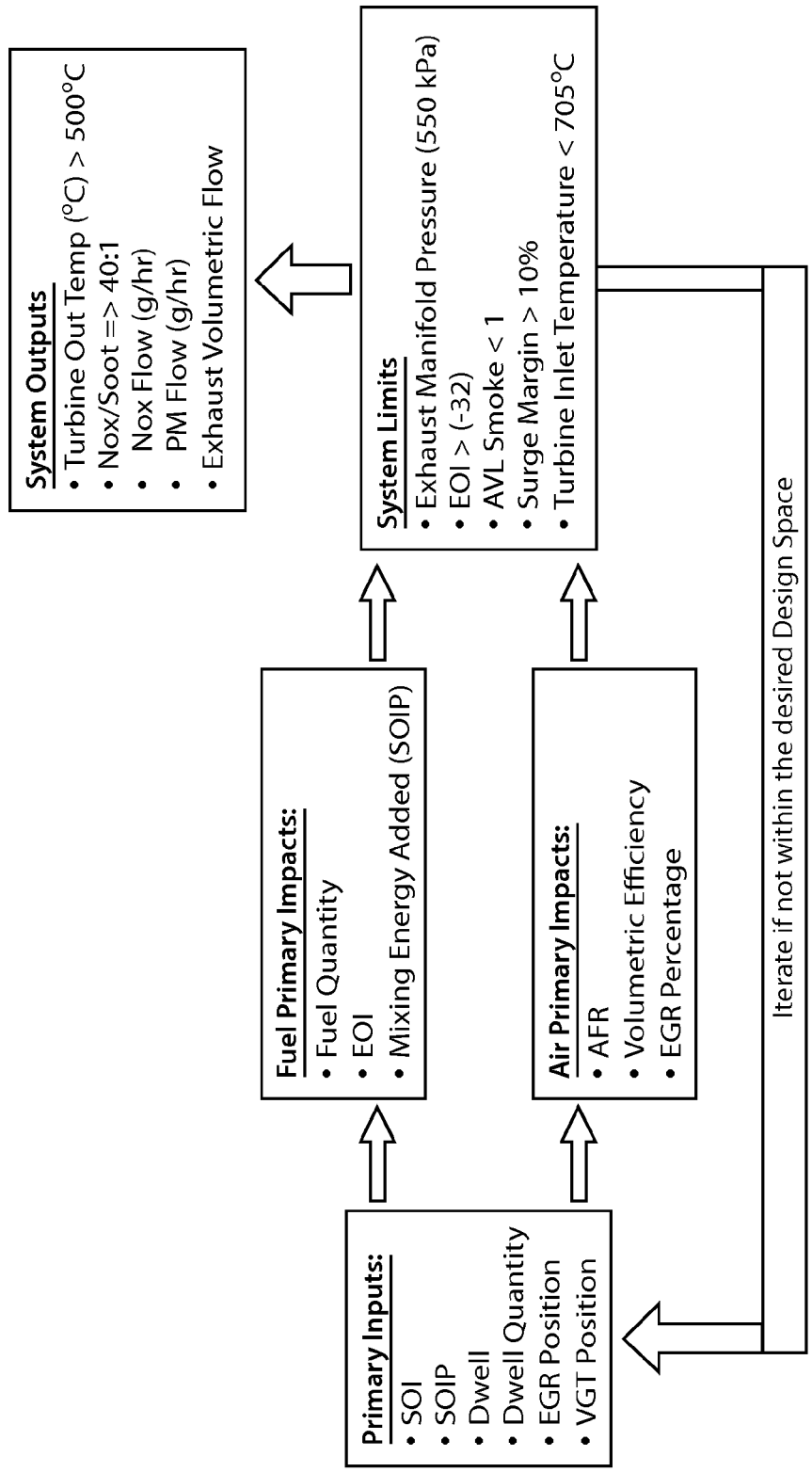
FIG. 2 is a logic flow diagram for arriving at an acceptable combination of engine operation parameters to produce rapid warm up low load operation according to the present disclosure.

Referring now to FIG. 2, a logic flow diagram may be utilized in arriving at a specific combination of control choices to produce acceptable system output in an engine that differs from the example engine illustrated in FIG. 1. The primary six control inputs may be considered as follows: 1) start of injection timing (SOI), 2) start of injection pressure (SOIP), 3) dwell between main injection and post injection, 4) the post injection quantity, 5) EGR valve position, and 6) VGT position. These settings will lead to a set of primary fuel impacts and a set of primary air impacts. Among the fuel primary impacts are 1) fuel quantity, 2) end of injection timing (EOI), and 3) mixing energy added (SOIP). The air primary impacts include 1) air to fuel ratio (AFR), 2) turbine volumetric efficiency, and 3) EGR percent. Although a wide latitude of different engine settings might be available, engineers may also need to consider system limits for their respective engines. In the case of the engine shown in FIG. 1, these system limits included 1) an exhaust manifold pressure limit of 550 kPa, 2) an end of injection for the post injection quantity before 32° after top dead center, 3) the AVL smoke limit was set to less than one, 4) the surge margin limit was greater than 10%, and finally, 5) the turbine inlet temperature limit was less than 705° C. Those skilled in the art will appreciate that different system limits may apply to different engine applications.

If the primary fuel and air impacts violate the above and/or other system limits for a given engine, it may be necessary to iterate within the desired design space in order to arrive at the desired system outputs. For instance, if a first set of design points result in the aftertreatment inlet temperature being below a predetermined temperature associated with the desired system outputs, the present disclosure would teach incremental adjustment in at least one of a reduction in exhaust gas recirculation percentage, a decrease in turbine efficiency and an increase in the quantity of fuel in the post injection. These considerations still require that the various settings be in the ranges discussed above. In other words, turbine efficiency should remain below 26%, the air fuel ratio should remain in the range of 20:1 to 30:1, and the exhaust gas recirculation should remain in the range between 28% and 36%.

In the event that the initial primary inputs result in the engine operating unstable, the present disclosure would suggest incrementally adjusting at least one of decreasing injection pressure, decreasing turbine efficiency and increasing the exhaust gas recirculation percentage. In the context of the present disclosure, an engine is considered unstable when a complete or partial misfire occurs after successful combustion. In the event that the settings result in a turbine inlet pressure that is above a predetermined turbine pressure limit, the present disclosure would suggest adjusting at least one of increasing turbine efficiency and increasing the exhaust gas recirculation percentage. When the smoke quantity exceeds a predetermined threshold, the iteration adjustment may include at least one of increasing injection pressure, reducing turbine efficiency and reducing the exhaust gas recirculation percentage. Finally, if the NOx to soot ratio is below some acceptable predetermined ratio, the present disclosure would suggest an iteration involving an incremental change that included at least one of increasing injection pressure, reducing the exhaust gas recirculation percentage, increasing turbine efficiency, decreasing a quantity of the post injection, and advancing a timing of the main injection. Thus, those skilled in the art will appreciate that arriving at a combination of primary inputs that achieve a set of desirable system outputs may require numerous iterations and various incremental adjustments from a starting point that may result in multiple incremental adjustments to turbine efficiency, the air fuel ratio, the exhaust gas recirculation percentage and the timing, pressures and quantities of the split injection.

Once a manufacturer arrives at a combination of primary inputs that produce a set of desirable system outputs for a given set of engine and aftertreatment hardware, those values may be stored in a look up table available to an electronic engine controller. When the electronic engine controller 16 determines that the engine is operating in a low load condition, that the inlet temperature to the aftertreatment system 20 is below some acceptable level, such as 300° C., and there is a desire to rapidly warm up the aftertreatment system, the electronic controller may execute a low load rapid warm up algorithm that retrieves the settings stored and adjusts engine operation according to the primary inputs discussed above. This control of the engine may be open loop, but more sophisticated closed loop control of the primary inputs and the system outputs would also fall within the scope of the present disclosure. For instance, precisely achieving any one of the turbine efficiency, the air fuel ratio and the exhaust gas recirculation range identified above may individually require some closed loop control. In addition, various environmental conditions may also require some adjustment to the pre-stored values in order to achieve the desired system outputs in different ambient conditions involving different environmental temperatures and pressures. The electronic engine controller may continue to execute the low load rapid warm up algorithm until engine load exceeds 550 kPa BMEP, which would mean that the engine is no longer operating at a low load condition.

INDUSTRIAL APPLICABILITY

The present disclosure finds general applicability to any compression ignition engine equipped with a variable geometry turbocharger, a high pressure exhaust gas recirculation loop, electronically controlled fuel injectors and an aftertreatment system with some minimal temperature operation requirements. The present disclosure finds specific application when there is a desire to maintain adequate ability to regenerate diesel particulate filters, manage temperatures for urea deposit removal from a catalyst and to provide for better operation of an aftertreatment system to reduce tailpipe out emissions.

The present disclosure also teaches that a good starting point, before iterating, could lay anywhere in the ranges identified above. Engineers might consider iterating from several different starting points in order to arrive at different combinations of primary inputs that all lead to acceptable sets of system outputs. It then becomes a matter of design choice which set of acceptable system outputs is most desirable for a given engine application. The teachings of the present disclosure allow for rapid warm up of aftertreatment and potentially the engine, while also providing for regeneration capability in the aftertreatment system. Finally, this strategy could also allow for low load NOx compliance in post Tier 4 regulations. The strategy of the present disclosure could be used to lower the diesel particulate filter load through regeneration. This strategy could also be used for urea deposit removal. This strategy could also be used to heat the diesel oxidation catalyst, the diesel particulate filter and the selective catalytic reduction catalyst. The strategy of the present disclosure would also be compatible and would also allow for the use of a seventh fuel injector in the exhaust system. Finally, the strategy of the present disclosure could be used to lower the non-road transient cycle NOx through lower engine out low load NOx, and for faster warm up temperatures to allow earlier urea dosing than might otherwise be possible.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. An electronically controlled compression ignition engine comprising:
    an engine housing that defines a plurality of cylinders;
    electronically controlled fuel injectors positioned for direct injection into respective ones of the plurality of cylinders;
    an electronically controlled high pressure exhaust recirculation system attached to the engine housing;
    an electronically controlled variable geometry turbocharger fluidly connected to the engine housing;
    an electronic engine controller in control communication with the fuel injectors, the high pressure exhaust recirculation system and the variable geometry turbine;
    the electronic engine controller is configured to execute a low load rapid warm up algorithm that generates control signals for a turbine efficiency below 26%, an air fuel ratio in a range between 20:1 and 30:1, an exhaust gas recirculation in a range between 28% and 36%, and a split fuel injection in an engine cycle that includes a main injection initiated before top dead center and a post injection initiated after top dead center.

2. The engine of claim 1 wherein the low load rapid warm up algorithm is executed open loop using predetermined stored values for turbine efficiency, air fuel ratio, exhaust gas recirculation percentage, main injection timing and quantity, and post injection timing and quantity.

3. The engine of claim 1 wherein the low load rapid warm up algorithm includes generated control signals for injection pressure in a range between 80 and 130 MPa., and a dwell between the main injection and the post injection greater than 3500 micro-seconds; and
    wherein the main injection being initiated in a range between 10 and 20 degrees before top dead center, and the post injection being initiated in a range between 15 and 32 degrees after top dead center.

4. The engine of claim 1 wherein the electronic engine controller is configured to discontinue the low load rapid warm up algorithm responsive to an engine load exceeding 550 KPa BMEP.

5. The engine of claim 1 wherein the low load rapid warm up algorithm is configured to generate control signals to command at least one of:
    reducing the exhaust gas recirculation percentage;
    decreasing turbine efficiency; and
    increasing a quantity of fuel in the post injection responsive to an aftertreatment inlet temperature being below a desired temperature.

6. The engine of claim 1 wherein the low load rapid warm up algorithm is configured to generate control signals to command at least one of:
    decreasing injection pressure;
    decreasing turbine efficiency; and
    increasing the exhaust gas recirculation percentage responsive to the engine being unstable.

7. The engine of claim 1 wherein the low load rapid warm up algorithm is configured to generate control signals to command at least one of:
    increasing turbine efficiency; and
    increasing the exhaust gas recirculation percentage responsive to a turbine inlet pressure being above a predetermined turbine pressure limit.

8. The engine of claim 1 wherein the low load rapid warm up algorithm is configured to generate control signals to command at least one of:
    increasing injection pressure;
    reducing turbine efficiency; and
    reducing the exhaust gas recirculation percentage responsive to smoke exceeding a predetermined threshold.

9. The engine of claim 1 wherein the low load rapid warm up algorithm is configured to generate control signals to command at least one of:
increasing injection pressure;
reducing the exhaust gas recirculation percentage;
increasing turbine efficiency;
decreasing a quantity of the post injection; and
advancing a timing of the main injection responsive to a NOx to soot ratio being below a predetermined ratio.

10. The engine of claim 1 wherein the low load rapid warm up algorithm is configured to generate control signals to command at least one of: reducing the exhaust gas recirculation percentage; decreasing turbine efficiency; and increasing a quantity of fuel in the post injection responsive to an aftertreatment inlet temperature being below a desired temperature;
decreasing injection pressure; decreasing turbine efficiency; and increasing the exhaust gas recirculation percentage responsive to the engine being unstable;
increasing turbine efficiency; and increasing the exhaust gas recirculation percentage responsive to a turbine inlet pressure being above a predetermined turbine pressure limit;
increasing injection pressure; reducing turbine efficiency; and reducing the exhaust gas recirculation percentage responsive to smoke exceeding a predetermined threshold;
increasing injection pressure; reducing the exhaust gas recirculation percentage; increasing turbine efficiency; decreasing a quantity of the post injection; and advancing a timing of the main injection responsive to a NOx to soot ratio being below a predetermined ratio.

11. A method of rapidly warming up an aftertreatment inlet temperature at low load conditions for a compression ignition engine equipped with a variable geometry turbocharger, electronically controlled fuel injectors and a high pressure exhaust gas recirculation loop, comprising the steps of:
setting turbine efficiency below 26%;
setting an air fuel ratio in a range between 20:1 and 30:1;
setting an exhaust gas recirculation in a range between 28% and 36%;
injecting fuel in a split injection with a main injection and a post injection in a same engine cycle, with the main injection being initiated before top dead center, and the post injection being initiated after top dead center.

12. The method of claim 11 including at least one of:
reducing the exhaust gas recirculation percentage;
decreasing turbine efficiency; and
increasing a quantity of fuel in the post injection;
when the aftertreatment inlet temperature is below a predetermined temperature.

13. The method of claim 11 including at least one of:
decreasing injection pressure;
decreasing turbine efficiency; and
increasing the exhaust gas recirculation percentage;
when the engine is unstable.

14. The method of claim 11 including at least one of:
increasing turbine efficiency; and
increasing the exhaust gas recirculation percentage;
when a turbine inlet pressure is above a predetermined turbine pressure limit.

15. The method of claim 11 including at least one of:
increasing injection pressure;
reducing turbine efficiency; and
reducing the exhaust gas recirculation percentage;
when smoke quantity exceeds a predetermined threshold.

16. The method of claim 11 including at least one of:
increasing injection pressure;
reducing the exhaust gas recirculation percentage;
increasing turbine efficiency;
decreasing a quantity of the post injection; and
advancing a timing of the main injection;
when a NOx to soot ratio is below a predetermined ratio.

17. The method of claim 11 including a step of setting injection pressure in a range between 80 and 130 MPa;
wherein the main injection being initiated in a range between 10 and 20 degrees before top dead center, and the post injection being initiated in a range between 15 and 32 degrees after top dead center.

18. The method of claim 11 including a step of setting a dwell between the main injection and the post injection greater than 3500 micro-seconds.

19. The method of claim 11 including a step of injecting at least 35 mm3 of fluid in the post injection.

20. The method of claim 19 including the steps of:
setting a dwell between the main injection and the post injection greater than 3500 micro-seconds;
setting injection pressure in a range between 80 and 130 MPa;
wherein the main injection being initiated in a range between 10 and 20 degrees before top dead center, and the post injection being initiated in a range between 15 and 32 degrees after top dead center; and
discontinuing rapid warm up when engine load exceeds 550 KPa BMEP.

* * * * *